United States Patent
Lee et al.

(10) Patent No.: US 10,490,792 B2
(45) Date of Patent: Nov. 26, 2019

(54) CAP ASSEMBLY FOR SECONDARY BATTERY

(71) Applicant: LG Chem, Ltd., Seoul (KR)

(72) Inventors: Byoung-Kook Lee, Daejeon (KR); Je-Jun Lee, Daejeon (KR); Do-Gyun Kim, Daejeon (KR); Sang-Sok Jung, Daejeon (KR)

(73) Assignee: LG Chem, Ltd. (KR)

( * ) Notice: Subject to any disclaimer, the term of this patent is extended or adjusted under 35 U.S.C. 154(b) by 14 days.

(21) Appl. No.: 15/578,438

(22) PCT Filed: Jun. 7, 2016

(86) PCT No.: PCT/KR2016/006009
§ 371 (c)(1),
(2) Date: Nov. 30, 2017

(87) PCT Pub. No.: WO2016/195457
PCT Pub. Date: Dec. 8, 2016

(65) Prior Publication Data
US 2018/0159100 A1    Jun. 7, 2018

(30) Foreign Application Priority Data
Jun. 5, 2015    (KR) .................. 10-2015-0079826

(51) Int. Cl.
*H01M 2/04*    (2006.01)
*H01M 2/12*    (2006.01)
*H01M 10/04*    (2006.01)

(52) U.S. Cl.
CPC .......... *H01M 2/1241* (2013.01); *H01M 2/04* (2013.01); *H01M 2/046* (2013.01); *H01M 2/12* (2013.01); *H01M 10/04* (2013.01); *H01M 10/0422* (2013.01); *H01M 2200/20* (2013.01)

(58) Field of Classification Search
CPC ............... H01M 2/1241; H01M 2/046; H01M 10/0422; H01M 10/04; H01M 2/12; H01M 2/04; H01M 2200/20
See application file for complete search history.

(56) References Cited

U.S. PATENT DOCUMENTS

| 8,420,257 | B2 | 4/2013 | Kim et al. |
| 8,501,333 | B2 | 8/2013 | Lee et al. |
| 9,153,805 | B2 | 10/2015 | Lee et al. |

(Continued)

FOREIGN PATENT DOCUMENTS

| CN | 101916833 A | 12/2010 |
| CN | 201667353 U | 12/2010 |
| KR | 20060037832 A | 5/2006 |

(Continued)

OTHER PUBLICATIONS

Extended European Search Report for Application No. EP16803810.7 dated Apr. 10, 2018.

(Continued)

*Primary Examiner* — Cynthia K Walls
(74) *Attorney, Agent, or Firm* — Lerner, David, Littenberg, Krumholz & Mentlik, LLP (57) ABSTRACT

The present disclosure relates to a cap assembly for a secondary battery and a secondary battery including the same. Specifically, a CID filter is fixed in the cap assembly such that, even when a gas is discharged due to the rupture of a safety vent, the CID short-circuit pressure is not affected.

15 Claims, 8 Drawing Sheets

(56) References Cited

U.S. PATENT DOCUMENTS 9,620,751 B2 4/2017 Kim et al.
2011/0076527 A1 3/2011 Kim et al.

FOREIGN PATENT DOCUMENTS

| KR | 20060085443 A | 7/2006 |
| KR | 20100032731 A | 3/2010 |
| KR | 20110035625 A | 4/2011 |
| KR | 20110039934 A | 4/2011 |
| KR | 20120041511 A | 5/2012 |
| KR | 20130009691 A | 1/2013 |
| WO | 2011003367 A1 | 1/2011 |

OTHER PUBLICATIONS

Search report from International Application No. PCT/KR2016006009, dated Sep. 27, 2016.

FIG. 1

Prior Art

CAP ASSEMBLY FOR SECONDARY BATTERY

CROSS-REFERENCE TO RELATED APPLICATIONS

The present application is a national phase entry under 35 U.S.C. § 371 of International Application No. PCT/KR2016/006009 filed Jun. 7, 2016, which claims priority to Korean Patent Application No. 10-2015-0079826 filed on Jun. 5, 2015 in the Republic of Korea, the disclosures of which are incorporated herein by reference.

TECHNICAL FIELD

The present disclosure relates to a cap assembly for a secondary battery and a secondary battery including the same. More specifically, it relates to a cap assembly for a secondary battery wherein a CID filter is fixed such that, even when a gas is discharged due to the rupture of a safety vent, the CID short-circuit pressure is not affected, and a secondary battery including the same.

BACKGROUND ART

Secondary batteries are classified into, depending on the shape of battery cases they employ, a cylindrical battery and a prismatic battery in which an electrode assembly is accommodated in a cylindrical or prismatic metal can and a pouch-type battery in which the electrode assembly is accommodated in a pouch-type case made of an aluminum laminate sheet.

The electrode assembly accommodated in the battery case is a power-generating device with a cathode/separator/anode structure that can be charged and discharged. The electrode assemblies are classified into a jelly roll-type structure which is obtained by interposing a separator between long sheet-like cathode and anode to which active materials are coated and then winding the same and a stacked structure in which a plurality of cathodes and anodes with separators interposed therebetween are stacked sequentially. The jelly roll-type electrode assembly is widely used due to their advantages including ease of fabrication and high energy density per weight. The jelly roll-type electrode assembly is commonly employed in cylindrical batteries.

The jelly roll-type electrode assembly undergoes repeated expansion and contraction during charge and discharge of the battery and, as a result, it tends to be deformed. During the charge and discharge, stress is concentrated at the central portion of the electrode assembly to cause the electrodes to penetrate the separator and contact with a metal pin at the center, resulting in internal short circuits. Heat caused by the internal short circuits leads to decomposition of an organic solvent and generation of a gas. The gas increases the internal pressure of the battery, resulting in rupture of the battery. The gas pressure inside the battery may increase when internal short circuits occur due to an external impact.

Attempts have been made to solve the safety problem of batteries. For example, a cap assembly of a cylindrical battery is designed such that a safety vent for exhausting a high-pressure gas, safety devices such as a PTC device for interrupting current at high temperature, a current interrupting device (CID) for interrupting current when the internal pressure of the battery is increased, etc. and a top cap forming a protruding terminal to protect the devices, etc. are fixed together by a sealing gasket. In general, the sealing gasket is designed to support the CID downwardly to prevent floating. However, in such an upward supporting structure, the CID filter may not be fixed sufficiently and floating may occur due to an impact delivered from inside or outside the battery. In particular, when a gas is produced inside the battery, the CID may be floated by the gas and the discharge of the gas may be interrupted. In addition, if the CID filter is welded to the safety vent in the state where it is not fixed sufficiently, assembling processability may be unsatisfactory because it is not easy to control the position of the CID filter and a gas discharge hole of the top cap.

Figure 1:
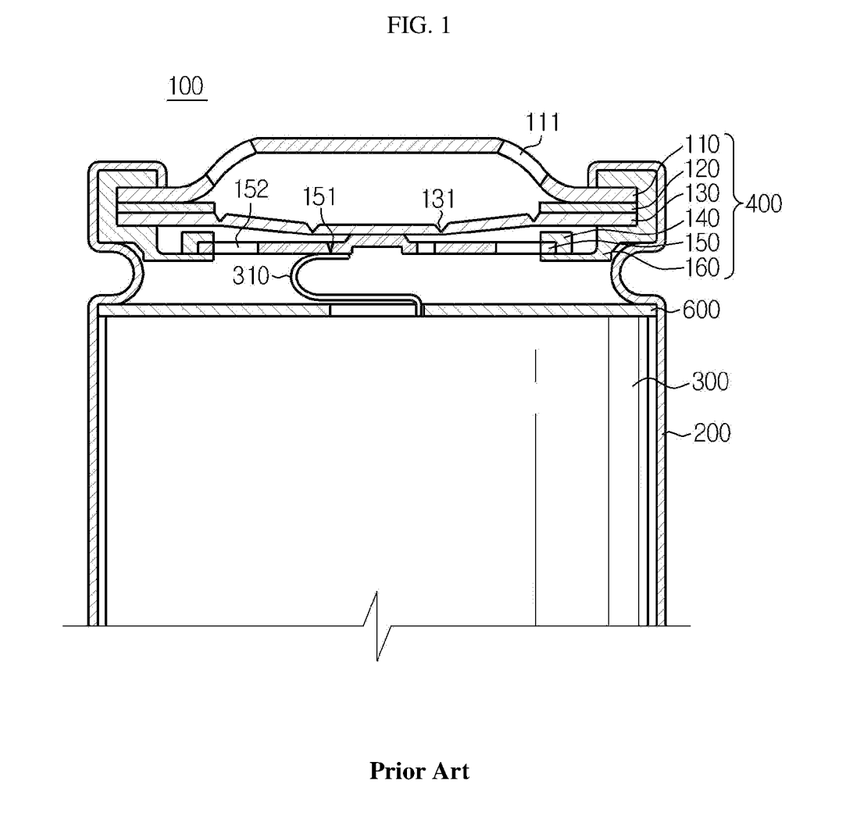
FIG. 1 shows the cross section of a cap assembly of a cylindrical secondary battery according to a prior art.

FIG. 1 shows the structure of a cap assembly of a cylindrical secondary battery disclosed in Korean Patent Application Publication No. 2012-0041511. The cap assembly includes a top cap 110, a PTC safety device 120, a safety vent 130, a current interrupting device (CID) 150, a CID gasket 140 and a sealing gasket 160. The safety vent 130 is formed such that its center portion protrudes downward and a notch 131 is formed near the center portion. The CID 150 may be at least partly welded to the lower end of the safety vent 130. Accordingly, the downwardly protruding portion of the safety vent 130 contacts with the CID 150 under normal state. But, when the shape of the safety vent 130 is reversed as the internal pressure is increased due to gas production, the electrical connection between the CID 150 and the safety vent 130 is interrupted. The CID gasket 140 is configured to surround the outer circumference of the CID 150 and the sealing gasket 160 is arranged to surround the edges of the top cap 110, the safety device 120 and the safety vent 130 and support the CID 150 downwardly. Although the CID device is supported by the gasket downwardly, its top or lateral sides are not fixed. Accordingly, it is highly likely that the CID device may float when a gas is produced. Therefore, it is necessary to solve this problem.

DISCLOSURE

Technical Problem

The present disclosure is designed to solve the problems of the related art, and therefore the present disclosure is directed to providing a cap assembly wherein a CID filter is fixed tightly such that, even when a gas is discharged due to the rupture of a safety vent, the CID is not floated inside a battery by the flow of the gas and the CID short-circuit pressure is not affected, and a secondary battery including the same. It will be easily understood that these and other objects and advantages of the present disclosure may be realized by the means shown in the appended claims and combinations thereof.

Technical Solution

The present disclosure provides a cap assembly and a secondary battery including the same.

A first exemplary embodiment of the present disclosure relates to a cap assembly equipped with a fixed-type CID, which includes: a safety vent made of a circular metal plate, wherein an indented portion is provided at the center thereof and one or more notch is formed on concentric circles around the indented portion; a CID (current interrupt device), which is made of a circular metal plate, comprises a filter portion and a supporting portion, the filter portion having a gas discharge hole, a center portion protruding at a center of CID and thereby joined to a indented portion of the safety vent, and a notch formed on a concentric circle around the center portion, the supporting portion having an outer diameter equal to or greater than the diameter of the filter portion and equipped on the filter portion with a ring shape, the filter portion and the supporting portion being formed integrally with a height difference; and a CID gasket which is disposed between the safety vent and the CID and insulates the safety vent and the CID, wherein the safety vent has a downwardly protruding CID fixing portion formed on a concentric circle between the concentric circle on which the notch is formed and the outer circumference of the circular metal plate and the CID fixing portion supports the CID directly or indirectly downwardly.

A second exemplary embodiment of the present disclosure relates to the first exemplary embodiment wherein the safety vent has at least two downwardly protruding CID fixing portions.

A third exemplary embodiment of the present disclosure relates to the first or second exemplary embodiment wherein the cap assembly includes: a top cap wherein a gas discharge hole is equipped and a protruding terminal is formed; and a gasket, wherein an inclined portion or a step portion is formed, which surrounds and seals the outer circumference of cap assembly devices including the safety vent, the CID, the CID gasket and the top cap.

A fourth exemplary embodiment of the present disclosure relates to any of the first to third exemplary embodiments wherein the joint strength of the center portion of the safety vent and the protruding portion of the CID is larger than the fracture strength of the all the respective notches formed in the safety vent and the CID.

A fifth exemplary embodiment of the present disclosure relates to any of the first to fourth exemplary embodiments wherein the CID gasket is ring-shaped, a step portion is formed at an outer circumference, the step portion corresponds to the height difference of the CID filter portion and the CID supporting portion and the step portion is seated on the height difference of the CID.

A sixth exemplary embodiment of the present disclosure relates to the fifth exemplary embodiment wherein the CID gasket has a protruding portion formed upwardly around the inner circumference of the ring and the CID supporting portion is seated between the step portion and the protruding portion.

A seventh exemplary embodiment of the present disclosure relates to any of the first to sixth exemplary embodiments wherein the CID is fixed as the CID fixing portion of the safety vent supports the upper side of the CID gasket downwardly.

An eighth exemplary embodiment of the present disclosure relates to any of the first to seventh exemplary embodiments wherein the CID is fixed as the CID fixing portion of the safety vent supports the upper side of the CID gasket downwardly and the CID is supported by the gasket upwardly as the CID supporting portion is seated on an inclined portion or a step portion of the gasket.

A ninth exemplary embodiment of the present disclosure relates to any of the second to eighth exemplary embodiments wherein the gas discharge hole equipped at the top cap and the gas discharge hole equipped at the CID are equipped at the same location when seen along the axis direction.

A tenth exemplary embodiment of the present disclosure relates to any of the first to ninth exemplary embodiments which further includes a PTC device between a top cap and the safety vent.

An eleventh exemplary embodiment of the present disclosure relates to any of the first to tenth exemplary embodiments wherein the CID supporting portion is seated on an inclined portion or a step portion of the gasket such that the leakage of an electrolyte is prevented.

A twelfth exemplary embodiment of the present disclosure relates to any of the first to eleventh exemplary embodiments wherein the safety vent further includes a lower notch formed on the concentric circle between the concentric circle on which the CID fixing portion is formed and the outer circumference of the circular metal plate.

A thirteenth exemplary embodiment of the present disclosure relates to any of the first to twelfth exemplary embodiments wherein the CID gasket has irregularities formed on the surface of a safety vent facing portion on which the safety vent is seated.

A fourteenth exemplary embodiment of the present disclosure relates to any of the first to thirteenth exemplary embodiments wherein the safety vent further includes a lower notch formed on the concentric circle between the concentric circle on which the CID fixing portion is formed and the outer circumference of the circular metal plate and the CID gasket has irregularities formed on the surface of a safety vent facing portion on which the safety vent is seated, wherein the irregularities are formed to contact the lower notch.

The present disclosure also relates to a cylindrical secondary battery including the cap assembly according to any of the first to fourteenth exemplary embodiments.

Advantageous Effects

A CID filter is fixed tightly such that, even when a gas is discharged due to the rupture of a safety vent, a CID is not floated inside a battery by the flow of the gas and the CID short-circuit pressure is not affected.

DESCRIPTION OF DRAWINGS

The accompanying drawings illustrate preferred exemplary embodiments of the present disclosure and, together with the foregoing disclosure, serve to provide further understanding of the technical features of the present disclosure. Therefore, the present disclosure is not construed as being limited to the drawings.

BEST MODE

Hereinafter, the present disclosure is described in further detail. It should be understood that the terms or words used in the specification and the appended claims should not be construed as limited to general or dictionary meanings, but should be interpreted based on the meanings and concepts corresponding to technical aspects of the present disclosure on the basis of the principle that the inventor is allowed to define terms appropriately for the best explanation. Therefore, the description and drawings proposed herein are just preferable examples for the purpose of illustrations only, not intended to limit the scope of the disclosure, so it should be understood that there may be various other equivalents and variations that can replace them at the time of the filing of this application.

The present disclosure relates to a cap assembly wherein a current interrupting device (CID) is fixed tightly inside the cap assembly such that the CID is not floated by the flow of a gas and a secondary battery including the same.

The cap assembly of the present disclosure includes:

a safety vent made of a circular metal plate, wherein an indented portion is provided at the center thereof and a notch is formed on a first concentric circle around the indented portion;

a current interrupting device (CID), which is made of a circular metal plate, comprises a filter portion and a supporting portion, the filter portion having a gas discharge hole, a center portion protruding at the center of CID and thereby joined to an indented portion of the safety vent, and a notch formed on a concentric circle around the center portion, the supporting portion having an outer diameter equal to or greater than the diameter of the filter portion and equipped on the filter portion with a ring shape, the filter portion and the supporting portion being formed integrally with a height difference; and a CID gasket which is disposed between the safety vent and the current interrupting device and insulates the safety vent and the current interrupting device, wherein the safety vent is equipped with a CID fixing portion supporting the CID downwardly and the CID fixing portion protrudes downwardly on a second concentric circle located between the first concentric circle of the safety vent and the outer circumference of the circular metal plate.

In a specific exemplary embodiment of the present disclosure, the CID fixing portion may be formed by bending the metal plate of the safety vent to protrude downwardly. In a specific exemplary embodiment of the present disclosure, the CID fixing portion may be formed to have a continuous groove along the circumference of the concentric circle (see 420a of FIG. 6). The groove may have a V- or U-shaped cross section, although not being limited thereto.

Also, in a specific exemplary embodiment of the present disclosure, two or more CID fixing portions may be formed. As a specific example, a first CID fixing portion protruding downwardly may be formed on the second concentric circle located between the first concentric circle of the safety vent and the outer circumference of the circular metal plate and a second CID fixing portion may be formed on a concentric circle inside or outside the first CID fixing portion. In addition, one or more CID fixing portion may be further formed outside the second CID fixing portion. The description about the first CID fixing portion may be referred to about the shape of the second and additional CID fixing portions.

Figure 9:
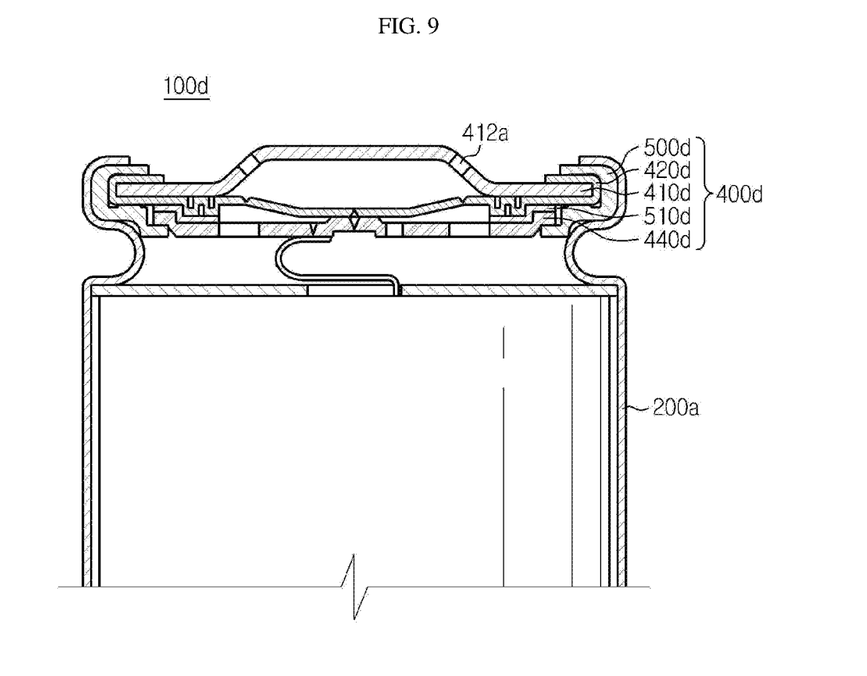
FIG. 9 shows two or more CID supporting portions formed according to a specific exemplary embodiment of the present disclosure.
Figure 11:
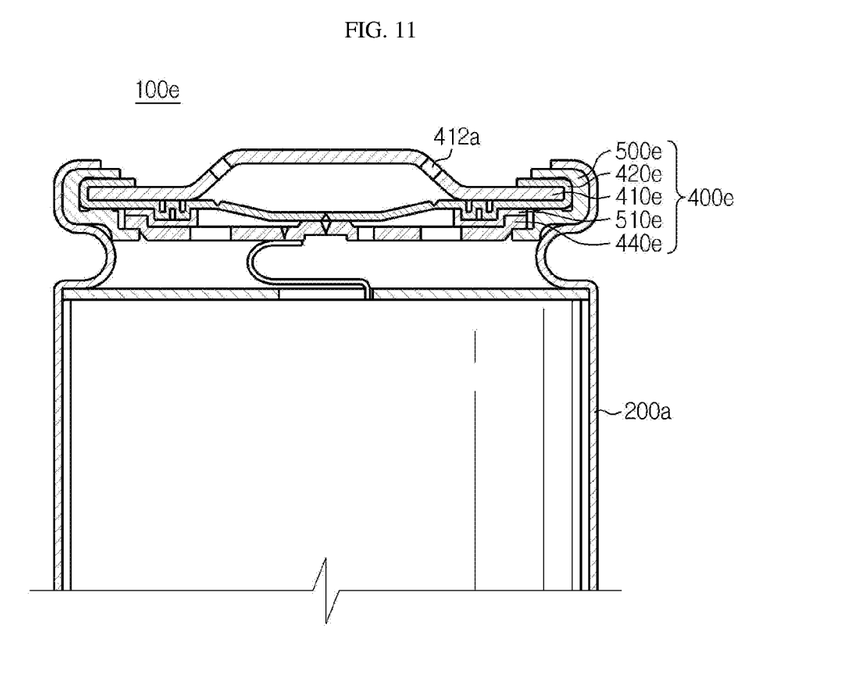
FIG. 11 shows two or more CID supporting portions formed and a protruding portion formed in a CID gasket according to a specific exemplary embodiment of the present disclosure.

FIG. 9 and FIG. 11 schematically show that two or more CID supporting portions formed. When two or more CID fixing portions are formed, the CID fixing portions are bent into a zigzag shape and serve to reduce external force occurring during the assemblage of the cap assembly. In addition, they may serve to make the internal pressure distribution uniform during use of the battery.

In the present disclosure, the CID fixing portion may be equipped to support the CID downwardly by contacting directly or indirectly via another internal device.

In general, the CID is fixed to the safety vent by welding the center portion of the CID to the indented portion of the safety vent. However, when an impact is applied to the battery due to dropping, etc. or when the safety vent is ruptured due to increased internal pressure caused by gas generation, the CID fixed to the safety vent may be floated. In this case, the CID may not be maintained at a predetermined short-circuit pressure and the short circuit of the battery may be induced.

The present disclosure is designed to stably fix and join the CID to the safety vent in order to prevent the floating of the CID. The safety vent is designed to fix the position of the CID by supporting the CID downwardly.

Also, in the present disclosure, the cap assembly includes a sealing gasket 510a which surrounds and seals the outer circumference of cap assembly devices including the safety vent, the CID, the CID gasket and the top cap. In a specific exemplary embodiment of the present disclosure, an inclined portion or a step portion may be formed in the sealing gasket such that the supporting portion of the CID is seated on the step portion or the inclined portion. Thus, the CID may be supported upwardly.

Figure 2:
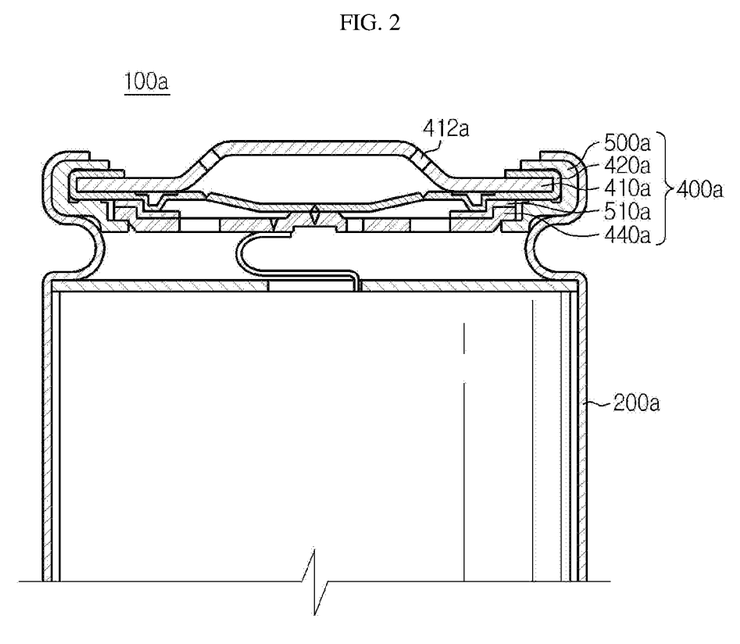
FIG. 2 shows the cross section of a cap assembly of a cylindrical secondary battery according to a specific exemplary embodiment of the present disclosure.

FIG. 2 shows a specific exemplary embodiment of the present disclosure. Referring to the figure, the CID is supported downwardly by the CID fixing portion of the safety vent protruding downwardly and is supported upwardly by the step portion of the sealing gasket.

The step portion or the inclined portion of the sealing gasket may be formed naturally as the gasket is clamped. As seen from FIG. 2, when the gasket is clamped with the battery can, the gasket is partly seated on the beading portion and the remaining part is pushed toward the inside of the can. The step portion or the inclined portion of the sealing gasket may be formed as the gasket is bent with a predetermined angle toward the direction of gravity. Alternatively, the step portion may be formed to have an adequate shape such that the supporting portion 448a of the CID can be seated stably.

Meanwhile, the step portion may be formed as the CID supporting portion is seated on the inclined portion and then clamped. During this procedure, the step portion may be formed naturally as pressure is applied between the CID supporting portion and the gasket and the gasket is pushed partly. If pressure is not applied between the CID supporting portion and the sealing gasket 510a during the clamping, the CID supporting portion may remain seated on the inclined portion.

In addition to the above-described methods, the inclined portion or the step portion may be formed in the sealing gasket 510a by any known method. That is to say, the step portion may be formed by artificially carving a groove in the sealing gasket 510a via an additional process.

When the CID is fixed upwardly and downward in this manner, the CID may be supported more tightly even when an impact is applied to the battery due to dropping, etc. In other words, whereas the existing battery has a structure in which the CID is fixed to the safety vent by welding only, the CID is fixed as being supported by the safety vent and the sealing gasket upwardly and downward in the cap assembly of the present disclosure. Accordingly, it exhibits better safety against impact applied to the battery. In particular, even when the portion of the CID jointed to the safety vent is detached from due to an impact applied to the battery, the CID exhibits much better safety because the CID remains tightly fixed to the safety vent.

In the present disclosure, the joint strength of the indented portion of the safety vent and the center portion of the CID should be larger than the fracture strength of the all the respective notches formed in the safety vent and the CID. It is because the joint between the indented portion of the safety vent and the center portion of the CID should remain undetached at least until the notch of the safety vent is ruptured and opened. If the joint is detached before the notch of the safety vent is ruptured, the current interrupting effect by the CID may not be achieved. Accordingly, it is desired that the joint strength of the indented portion of the safety vent and the center portion of the CID is as strong as possible and its upper limit is not specially limited.

Specifically, in the present disclosure, the gas discharge hole equipped at the top cap and the gas discharge hole equipped at the CID may be equipped at the same location when seen along the axis direction. When the gas discharge holes are equipped at the same location, the gas discharge efficiency is improved because the gas discharge path becomes linear.

In an exemplary embodiment of the present disclosure, the safety vent may further include a lower notch formed on the concentric circle between the concentric circle on which the CID fixing portion is formed and the outer circumference of the circular metal plate. In a specific exemplary embodiment, the lower notch is formed on the lower side of the safety vent such that the open portion of the notch faces the lower side of the cap assembly and is contacted with the CID gasket. Also, in an exemplary embodiment of the present disclosure, the CID gasket may further have irregularities formed on the surface of a safety vent facing portion on which the safety vent is seated.

In a specific exemplary embodiment of the present disclosure, the cap assembly of the present disclosure may have both the lower notch and the irregularities, and the irregularities may be formed to contact the open portion of the lower notch.

In the present disclosure, a PTC device (not shown) may be further included between the top cap and the safety vent. Although the PTC device is interposed between the top cap and the safety vent in general, the PTC device may also be nonexistent. The PTC (positive temperature coefficient) device interrupts current as its resistance is increased greatly when temperature inside the battery is increased. A more detailed description is omitted because it is a device widely known in the related art. As the PTC device, one known in the art can be used without limitation.

Hereinafter, exemplary embodiments of the present disclosure are described in further detail referring to the attached drawings. However, the following exemplary embodiments are provided to improve understanding of the present disclosure and the scope of the present disclosure is limited by them.

FIG. 2 shows the structure of a cap assembly according to an exemplary embodiment of the present disclosure. Referring to FIG. 2, a cap assembly 400a has a structure in which a sealing gasket 500a mounted on an upper beading portion of a can 200a, a top cap 410a inside thereof, a safety vent 420a for decreasing internal pressure and a CID 440a are in contact with each other. A CID gasket 510a may be interposed between the safety vent 420a and the CID 440a to electrically insulate the safety vent 420a and the CID 440a. A cylindrical secondary battery 100a may be prepared by inserting an electrode assembly (not shown into the can 200a, injecting an electrolyte thereinto and mounting the cap assembly 400a on an open upper end of the can 200a.

Figure 3:
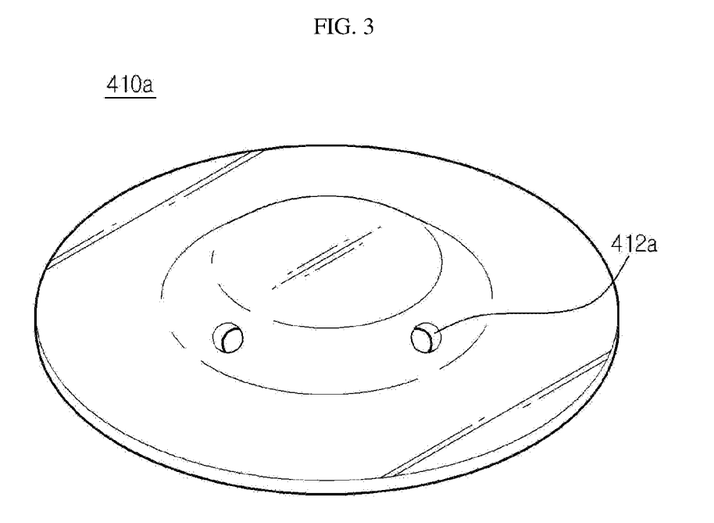
FIG. 3 shows a top cap of a cylindrical secondary battery according to a specific exemplary embodiment of the present disclosure.

FIG. 3 is an exploded view of the top cap 410a as an element of the cap assembly of the present disclosure. The top cap 410a serves as a cathode terminal for connection with an external circuit as its center protrudes upwardly and has a plurality of gas discharge holes 412a through which a gas compressed in the can may be discharged, formed along the protruding portion.

Figure 4:
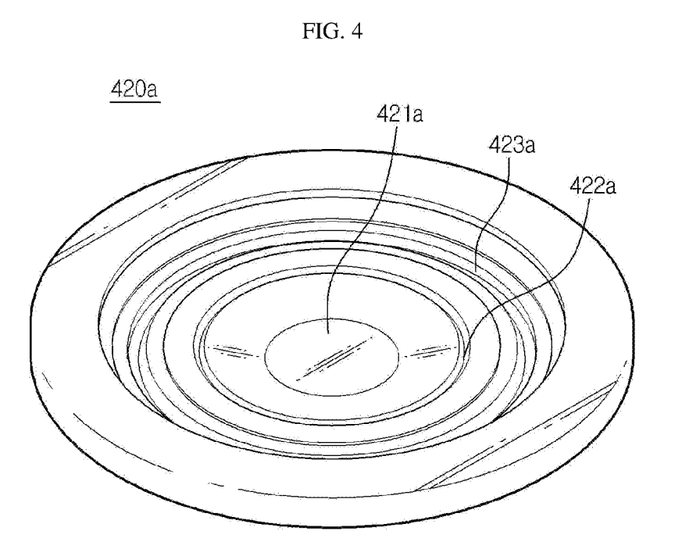
FIG. 4 shows a safety vent of a cylindrical secondary battery according to a specific exemplary embodiment of the present disclosure.

FIG. 4 is an exploded view of the safety vent 420a as an element of the cap assembly of the present disclosure. The safety vent 420a is made of a thin circular plate through which current can pass and has a notch 422a formed on a first concentric circle around the center. Its center is indented to form an indented portion 421a. The indented portion 421a is joined to a center portion 444a of the CID 440a located therebelow. Although it is shown in the figure that the safety vent 420a has one notch with a shape of a closed curve on one concentric circle, the number and shape of the notch may be varied as desired. For example, a notch with shape of a closed curve or an open curve may be further formed on a second concentric circle having the same center as the first concentric circle on which the notch 422a is formed, inside or outside the first concentric circle. If two or more notches are formed, even when one notch is ruptured due to the internal pressure of the battery, the indented portion 421a may be prevented from being completely detached from the safety vent 420a. If the indented portion 421a is completely detached, it may cause short circuits as it floats freely inside the battery. In this case, one notch (first notch) may be formed more deeply than the other notch (second notch) such that the joint strength of the first notch is smaller than the joint strength of the other notch.

The first and second notches are formed on the upper side of the safety vent 420a such that the open portions of the notches face the upside of the cap assembly 400a.

When the internal pressure of the can 200a increases above a critical value, the safety vent is deformed upwardly as the notch 422a formed in the safety vent 420a is ruptured. Then, the indented portion 421a is pushed upwardly and the center portion 444a of the CID joined to its lower end is detached from the CID 440a, thereby interrupting current and preventing gas generation. The battery is ensured because the generated gas is discharged through the gas discharge hole 412a of the top cap 410a.

When the indented portion 421a of the safety vent 420a and the center portion 444a of the CID are separated as the notch of the safety vent 420a is ruptured, the CID 440a may deviate from its original location due to the gas flow. In the cap assembly according to the present disclosure, the safety vent 420a is equipped with a CID fixing portion 423a which fixes the location of the CID 440a. Therefore, even when the indented portion 421a of the safety vent and the center portion 444a of the CID are separated, the CID is prevented from being detached because the CID fixing portion 423a supports the outer circumference of the CID 440a downwardly. In a specific exemplary embodiment, the protruding lower side of the CID fixing portion 423a is designed to compress the upper side of the CID filter portion downwardly and the lateral side of the CID fixing portion is designed to compress the height difference of the CID filter portion and the CID supporting portion laterally. Specifically, the depth and shape of the CID fixing portion 423a protruding downwardly may correspond to the height and shape of the height difference of the CID filter portion 446a and the CID supporting portion 448a such that the CID 440a and the CID fixing portion 423a contact with each other with no space therebetween.

In a specific exemplary embodiment of the present disclosure, a CID gasket 510a is further equipped between the CID fixing portion 423a and the CID 440a such that the CID 440a and the safety vent 420a are electrically insulated. The CID gasket has a shape of a circular ring with a predetermined width. A step portion is formed at an outer circumference of the CID gasket 510a so as to correspond to the height difference of a CID filter 446a of the CID 440a and the CID supporting portion 448a of the CID filter 446a. The CID fixing portion 423a is formed so as to correspond to the shape of the step portion so that the CID, the CID gasket and the CID fixing portion are supported by being contacted with no space.

Figure 10A:
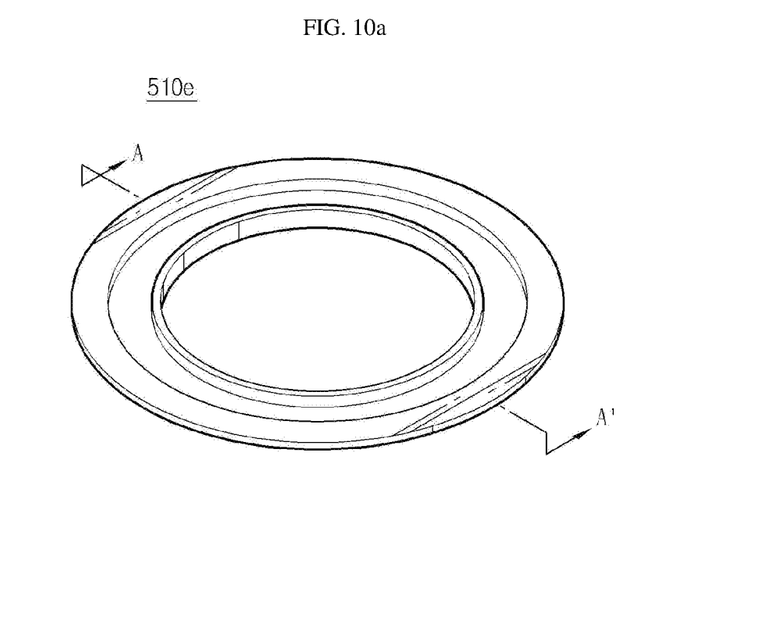
FIG. 10a and FIG. 10b show a protruding portion formed in a CID gasket according to a specific exemplary embodiment of the present disclosure.
Figure 10B:
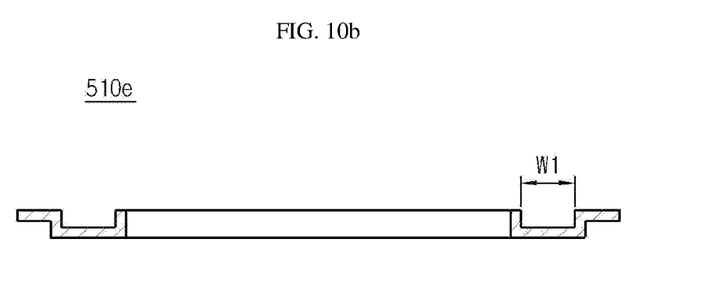

In a specific exemplary embodiment of the present disclosure, the CID gasket 510a may have a protruding portion formed upwardly around the inner circumference of the ring. In this case, in the cap assembly according to the present disclosure, the CID supporting portion may be seated between the step portion and the protruding portion of the CID gasket with no space. FIG. 10a and FIG. 10b schematically show the protruding portion protruding upwardly formed at the inner circumference of the ring of the CID gasket. Referring to the figures, a groove having a width W1 corresponding to the distance between the protruding portion and the step portion is formed in the CID gasket, with the protruding portion and the step portion as side walls, and the CID supporting portion of the safety vent is seated on the groove. In a specific exemplary embodiment of the present disclosure, the side walls of the groove and the CID supporting portion may be disposed tightly with no space therebetween.

Also, in a specific exemplary embodiment of the present disclosure, because the CID is seated on the step portion of the sealing gasket 500a and upwardly supported by the step portion of the sealing gasket, the location of the CID is fixed tightly and the deviation or floating of the CID may be prevented despite the flow of a gas.

In a specific exemplary embodiment of the present disclosure, the outer portion of the safety vent 420a may be bent to have a '⊂' shape such that the safety vent 420a surrounds the outer circumference of the top cap 410a. As the outer circumference of the safety vent is bent to partly surround the upper side of the top cap 410a as described above, there is provided an effect that a path for leakage to the outside of the battery is extended. Therefore, even when the pressure inside the battery is increased due to gas generation, etc., the leakage of the electrolyte may be prevented.

Figure 5:
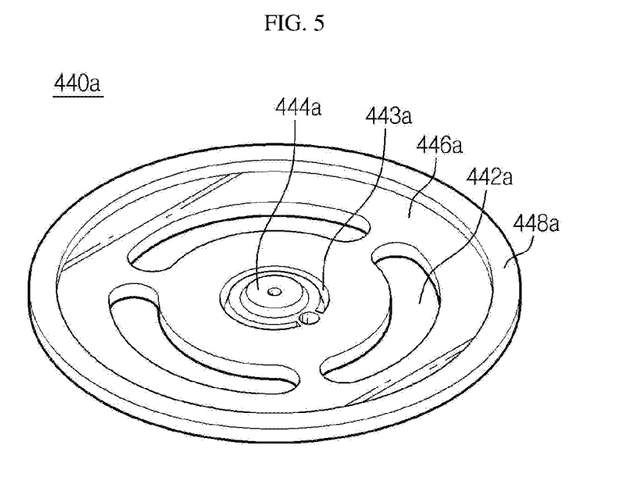
FIG. 5 shows a CID of a cylindrical secondary battery according to a specific exemplary embodiment of the present disclosure.

FIG. 5 shows the CID 440a as an element of the cap assembly of the present disclosure. The CID 440a is a conductive circular plate. It serves to interrupt current when the gas inside the battery is discharged and is installed under the safety vent 420a.

In the CID 440a, which is made of a circular metal plate, a gas discharge hole 442a and a center portion 444a joined to the indented portion 421a of the safety vent are equipped at the center thereof, a filter portion 446a wherein a notch 443a is formed on a concentric circle around the center portion and a supporting portion 448a having an outer diameter equal to or greater than the diameter of the filter portion and equipped on the filter portion with a ring shape are formed integrally. That is to say, the CID 440a is composed of the filter portion 446a as a lower circular plate portion and the supporting portion 448a with a larger outer diameter provided thereon.

When compressed gas is applied to the safety vent 420a due to increased pressure inside the battery, the indented portion 421a of the safety vent is pushed upwardly and the center portion 444a welded to the indented portion 421a is separated from the filter portion 446a as the notch 443a is cut open.

Figure 6:
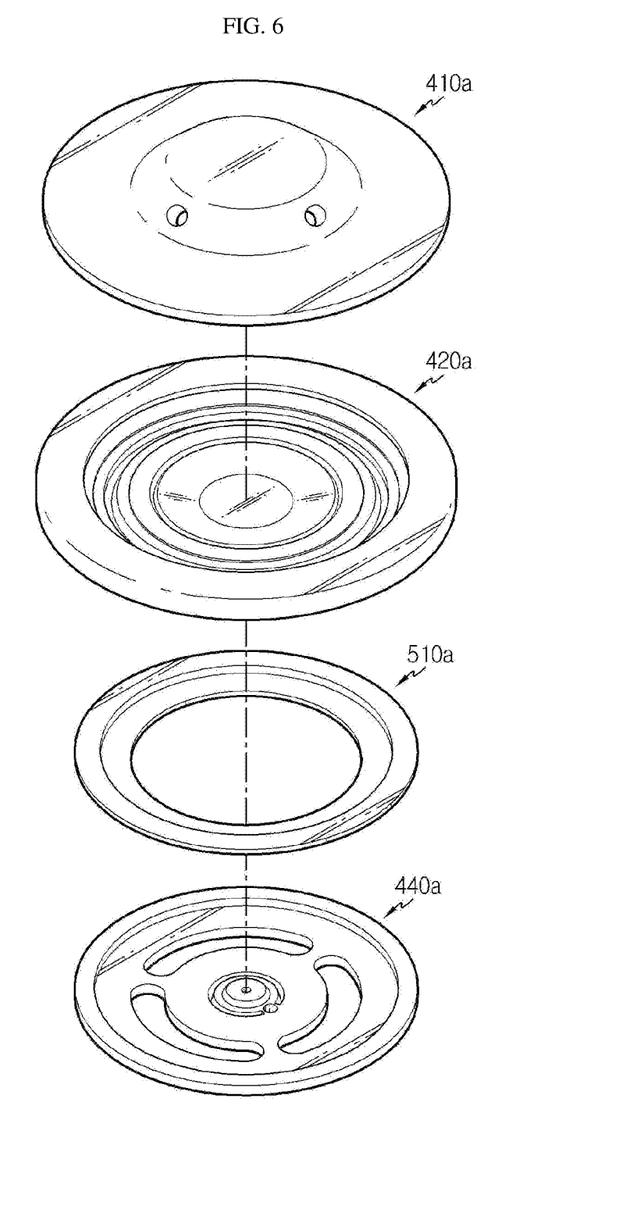
FIG. 6 is an exploded perspective view of internal devices of a cap assembly according to a specific exemplary embodiment of the present disclosure.

FIG. 6 is an exploded perspective view of the cap assembly 400a of the present disclosure. As seen from FIG. 6, the cap assembly 400a of the present disclosure may be prepared by disposing the CID gasket 510a on the CID, seating the safety vent thereon, stacking the top cap thereon and then surrounding the outer circumference of the resulting stack with a gasket.

Referring to FIG. 6, it is similar to the structure of the existing cap assembly in that the top cap 410a and the safety vent 420a are contacted tightly with each other and are fixed by surrounding with a gasket 500a. However, there is a difference in that the CID supporting portion 423a protruding downwardly from the safety vent 420a tightly supports the CID gasket 510a and the CID 440a downwardly to fix the CID tightly.

Figure 7:
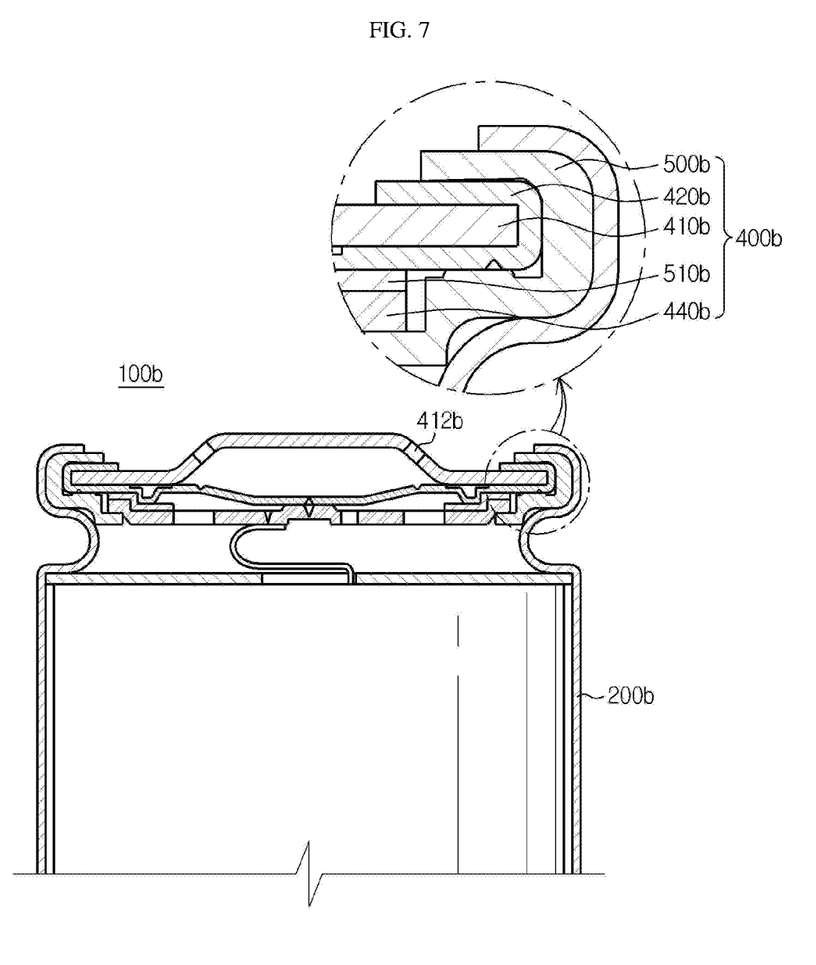
FIG. 7 and FIG. 8 schematically show a cap assembly according to a specific exemplary embodiment of the present disclosure.
Figure 8:
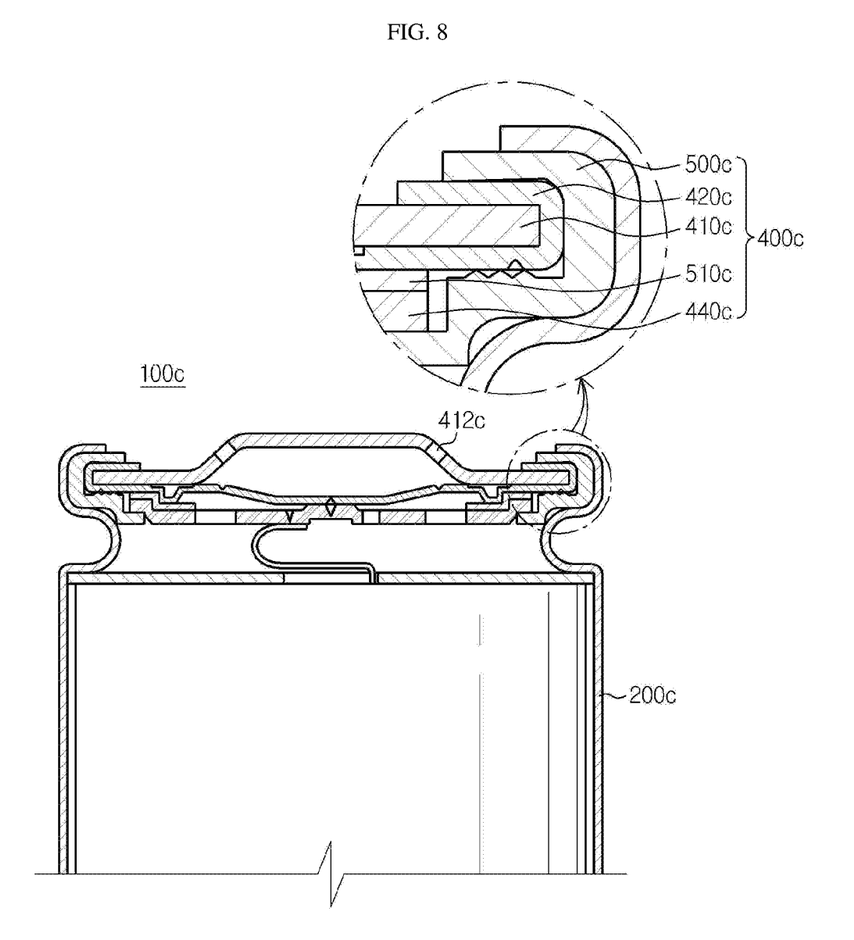

FIG. 7 and FIG. 8 show the cap assembly according to an exemplary embodiment of the present disclosure.

Referring to FIG. 7, the safety vent is further equipped with a lower notch on the concentric circle between the CID fixing portion and the outer circumference of the circular metal plate. Specifically, the lower notch is formed on the lower side of the safety vent such that the open portion of the notch faces the CID gasket. The second notch may have a cross section with a shape of a triangle, a rectangle, a semicircle, etc., although not being limited thereto.

FIG. 8 shows the cap assembly according to a specific exemplary embodiment of the PRESENT disclosure. Referring to the figure, the CID gasket has irregularities formed on the surface of the safety vent facing portion on which the safety vent is seated and the irregularities may be formed to face the open portion of the lower notch.

The cylindrical secondary battery of the present disclosure includes the cap assembly of the present disclosure described above. For the technical features and constitutions of the cylindrical secondary battery except for the cap assembly, those of the prior art can be used without limitation. A detailed description thereabout will be omitted because they are widely known to those of ordinary skill in the art.

Although the present disclosure was described with limited exemplary embodiments and drawings, it will be obvious to those of ordinary skill in the art that the present disclosure is not limited by them and various changes and modifications can be made within the scope of the appended claims and their equivalents.

EXAMPLES

1. Preparation of Battery

An electrode assembly for a lithium ion secondary battery with a nominal voltage of 3.58 V and a capacity of 3000 mAh was prepared. In the electrode assembly, carbon was used as an anode and lithium manganese oxide was used as a cathode. The prepared electrode assembly was loaded in a cylindrical aluminum battery can and, after injecting an electrolyte, the upper end of the battery can was sealed using a cap assembly according to Comparative Example or Examples 1-2. The electrolyte was a 7:3 (vol/vol) mixture of ethylene carbonate and propylene carbonate containing 1 M $LiPF_6$.

As the cap assembly, one with no CID supporting portion in a safety vent and having the cross section shown in FIG. 1 was used for Comparative Example. For Examples 1 and 2, ones with one and two CID supporting portions in safety vents and having the cross sections shown FIG. 2 and FIG. 9 were used, respectively.

2. Measurement of Distribution of Operation Pressure

The change in the internal pressure of the batteries prepared in Comparative Example and Examples 1 and 2 was monitored while repeating charging and discharging within the nominal voltage range until the CID was activated.

The decrease in the operation pressure of the batteries prepared in Comparative Example and Examples 1 and 2 was measured relative to the preset operation pressure of the cap assembly as 100%. The result is summarized in Table 1.

TABLE 1

|  | Actual operation pressure | Decrease in operation pressure |
|---|---|---|
| Comparative Example | 87.5% | 12.5% |
| Example 1 | 94.4% | 5.6% |
| Example 2 | 97.2% | 2.8% |

DETAILED DESCRIPTION OF MAIN ELEMENTS 100, 100a, 100b, 100c, 100d, 100e: cylindrical secondary battery
400, 400a, 400b, 400c, 400d, 400e: cap assembly
410a, 410b, 410c, 410d, 410e: top cap
420a, 420b, 420c, 420d, 420e: safety vent
440a, 440b, 440c, 440d, 440e: CID
200, 200a, 200b, 200c, 200d, 200e: battery can
412a, 412b, 412c, 412d, 412e: gas discharge hole
500a, 500b, 500c, 500d, 500e: sealing gasket
510a, 510b, 510c, 510d, 510e: CID gasket
421a, 421b, 421c, 421d, 421e: indented portion
422a, 422b, 422c, 422d, 422e: notch
423a, 423b, 423c, 423d, 423e: CID fixing portion
444a, 444b, 444c, 444d, 444e: CID center portion
443a, 443b, 443c, 443d, 443e: notch
448a, 448b, 448c, 448d, 448e: supporting portion
446a, 446b, 446c, 446d, 446e: filter portion
442a, 442b, 442c, 442d, 442e: gas discharge hole

What is claimed is:

1. A cap assembly equipped with a fixed-type current interrupt device (CID), which comprises:
    a safety vent made of a circular metal plate, wherein an indented portion is provided at the center thereof and one or more notch is formed on concentric circles around the indented portion;
    a current interrupt device, which is made of a circular metal plate, comprises a filter portion and a supporting portion, the filter portion having a gas discharge hole and a center portion of the current interrupt device and thereby joined to a protruding portion of the safety vent, and a notch formed on a concentric circle around the center portion, and the supporting portion having an outer diameter equal to or greater than the diameter of the filter portion and equipped on the filter portion with a ring shape, the filter portion and the supporting portion being formed integrally with a height difference; and
    a current interrupt device gasket which is disposed between the safety vent and the current interrupt device and insulates the safety vent and the current interrupt device,
    wherein the safety vent has a downwardly protruding current interrupt device fixing portion formed on a concentric circle between the concentric circle on which the notch is formed and the outer circumference of the circular metal plate and the current interrupt device fixing portion supports the current interrupt device directly or indirectly downwardly.

2. The cap assembly according to claim 1, wherein the safety vent has at least two downwardly protruding current interrupt device fixing portions.

3. The cap assembly according to claim 1, which comprises:
    a top cap wherein a gas discharge hole is equipped and a protruding terminal is formed; and
    a gasket, wherein an inclined portion or a step portion is formed, which surrounds and seals the outer circumference of cap assembly devices including the safety vent, the current interrupt device, the current interrupt device gasket and the top cap.

4. The cap assembly according to claim 1, wherein the joint strength of the center portion of the safety vent and the protruding portion of the current interrupt device is larger than the fracture strength of the all the respective notches formed in the safety vent and the current interrupt device.

5. The cap assembly according to claim 1, wherein the current interrupt device gasket is ring-shaped, a step portion is formed at an outer circumference, the step portion corresponds to the height difference of the current interrupt device filter portion and the current interrupt device supporting portion and the step portion is seated on the height difference of the current interrupt device.

6. The cap assembly according to claim 5, wherein the current interrupt device gasket has a protruding portion formed upwardly around the inner circumference of the ring and the current interrupt device supporting portion is seated between the step portion and the protruding portion.

7. The cap assembly according to claim 1, wherein the current interrupt device is fixed as the current interrupt device fixing portion of the safety vent supports the upper side of the current interrupt device gasket downwardly.

8. The cap assembly according to claim 1, wherein the current interrupt device is fixed as the current interrupt device fixing portion of the safety vent supports the upper side of the current interrupt device gasket downwardly and the current interrupt device is supported by the gasket upwardly as the current interrupt device supporting portion is seated on an inclined portion or a step portion of the gasket.

9. The cap assembly according to claim 2, wherein the gas discharge hole equipped at the top cap and the gas discharge hole equipped at the current interrupt device are equipped at the same location when seen along the axis direction.

10. The cap assembly according to claim 1, which further comprises a positive temperature coefficient (PTC) device between a top cap and the safety vent.

11. The cap assembly according to claim 1, wherein the current interrupt device supporting portion is seated on an inclined portion or a step portion of the gasket such that the leakage of an electrolyte is prevented.

12. The cap assembly according to claim 1, wherein the safety vent further comprises a lower notch formed on the concentric circle between the concentric circle on which the current interrupt device fixing portion is formed and the outer circumference of the circular metal plate.

13. The cap assembly according to claim 1, wherein the current interrupt device gasket has irregularities formed on the surface of a safety vent facing portion on which the safety vent is seated.

14. The cap assembly according to claim 1, wherein the safety vent further comprises a lower notch formed on the concentric circle between the concentric circle on which the current interrupt device fixing portion is formed and the outer circumference of the circular metal plate and the current interrupt device gasket has irregularities formed on the surface of a safety vent facing portion on which the safety vent is seated, wherein the irregularities are formed to contact the lower notch.

15. A cylindrical secondary battery comprising the cap assembly according to claim 1.

* * * * *